United States Patent [19]
Yeates et al.

[11] Patent Number: 5,644,782
[45] Date of Patent: Jul. 1, 1997

[54] SYSTEM WITH VIRTUAL UPDATE CAPABLE READ-ONLY MEMORY

[75] Inventors: Anthony J. Yeates; Michael R. Landis, both of Cary; Jeffrey K. Berger, Palatine, all of Ill.

[73] Assignee: Motorola, Inc., Schaumburg, Ill.

[21] Appl. No.: 323,564

[22] Filed: Oct. 17, 1994

[51] Int. Cl.$^6$ .................................................. G06F 13/00
[52] U.S. Cl. ........................ 395/830; 395/427; 395/821
[58] Field of Search ............................. 395/497.04, 427, 395/830

[56] References Cited

U.S. PATENT DOCUMENTS

| | | | |
|---|---|---|---|
| 5,119,353 | 6/1992 | Asakura | 369/13 |
| 5,247,575 | 9/1993 | Sprague et al. | 380/9 |
| 5,537,636 | 7/1996 | Uchida et al. | 395/600 |
| 5,541,840 | 7/1996 | Gurne et al. | 364/424.03 |
| 5,548,783 | 8/1996 | Jones et al. | 395/836 |

*Primary Examiner*—Jack B. Harvey
*Assistant Examiner*—John Travis
*Attorney, Agent, or Firm*—Andrew S. Fuller

[57] ABSTRACT

A system having a virtual update capable read-only memory, includes a data storage system (270), and a device driver (272) which interfaces with the data storage system (270). The data storage system (270) includes a read-only memory device (274) which stores primary data, and an auxiliary memory device (276) which stores supplementary data reflecting updates to the primary data. The device driver (272) has a read handler which provides a response to a read request consisting of a combination of primary data from the read-only memory device (274) and supplementary data from the auxiliary memory device (276).

11 Claims, 4 Drawing Sheets

SYSTEM WITH VIRTUAL UPDATE CAPABLE READ-ONLY MEMORY

TECHNICAL FIELD

This invention relates in general to a system incorporating data storage devices, and more particularly, a system using a read-only memory device as a primary data storage medium.

BACKGROUND OF THE INVENTION

Many computing applications require access to a data source having relatively stable information, i.e., information that changes infrequently. Applications using reference information include dictionaries, reference databases, map display programs, engineering drawing display programs, among others. Oftentimes, reference information is published on read-only memory devices, such as a compact disk read-only memory (CD-ROM) device, or other write-protected media, and distributed for use in such computing applications. Occasionally, such reference information must be replaced or otherwise updated to ensure that current information is being used in the respective applications. A typical solution is the replacement of the reference material media with new media containing updated information. Depending on the frequency of such updates, this update process can involve significant expense. Moreover, there may be a critical need to provide updates to certain applications in an expedient manner for immediate use by the application.

Consider an application in which field workers must have ready access to the most current information in order to provide customer service. These field workers may use portable computing devices, such as laptop computers, in order to provide on-site service. Most of the information required to satisfy the particular application may be relatively static, and thus may be suitable for distribution on read-only media, such as a CD-ROM device. However, relatively minor periodic updates may be needed to keep the reference information current. A practical method for providing the necessary updates in a time and cost efficient manner is useful for such applications.

It is desirable to have a system in which read-only data provides a primary source of information, yet which provides for the update of such information in an expedient and cost effective manner.

DETAILED DESCRIPTION OF THE PREFERRED EMBODIMENT

Figure 1:
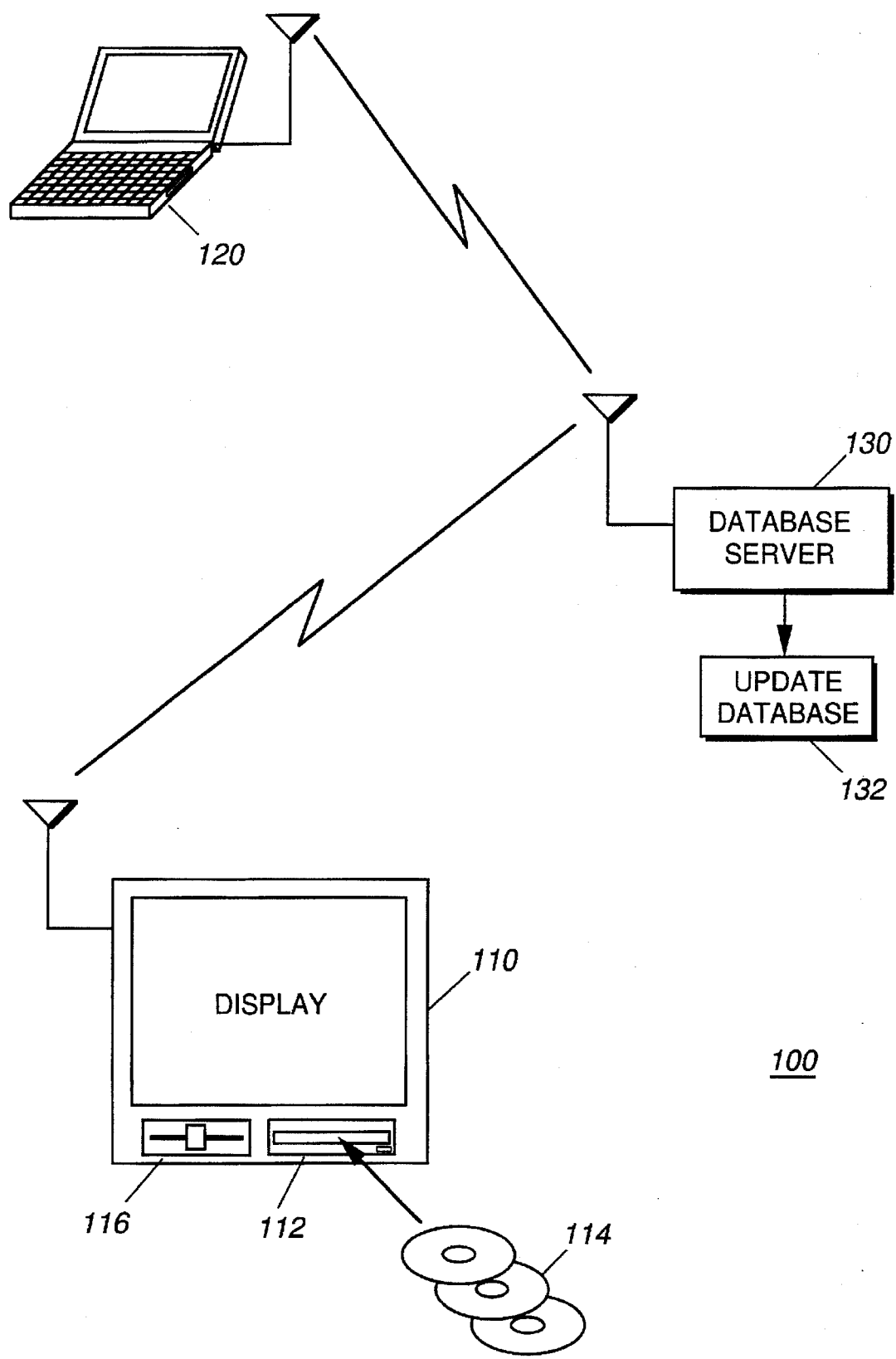
FIG. 1 is a representation of an information system in which remote computing devices are networked to a data source for update purposes, in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, an information system 100 is shown having computing devices networked to a data source, in accordance with the present invention. A computer implemented database server 130 has access to a database 132 on which is stored information for updating reference data which have been distributed or supplied for use by various data clients 110, 120 which are data clients of the database server 130. The data clients 110, 120 are computing devices and include a laptop computer 120 with wireless network capability, and a display-oriented computing device 110, also with wireless network capability. Other computing devices may be used including pen-based computers, personal digital assistants, and the like. The display-oriented computing device 110 has a CD-ROM drive 112, for accepting one or more CD-ROMs 114, and an auxiliary memory device 116, such as a floppy disk drive or a computer hard disk. The data clients 110, 120 have applications that operate on relatively static reference data, which may be combined with other application dependent data sources. The database server 130 provides updates to the data clients 110, 120 in response to requests for updates from the data clients. The data clients 110, 120 are linked to the database server via a wireless communication link, such as a wireless data network. The data clients 110, 120 differ in hardware and software configurations, and in the particular applications available.

Figure 2:
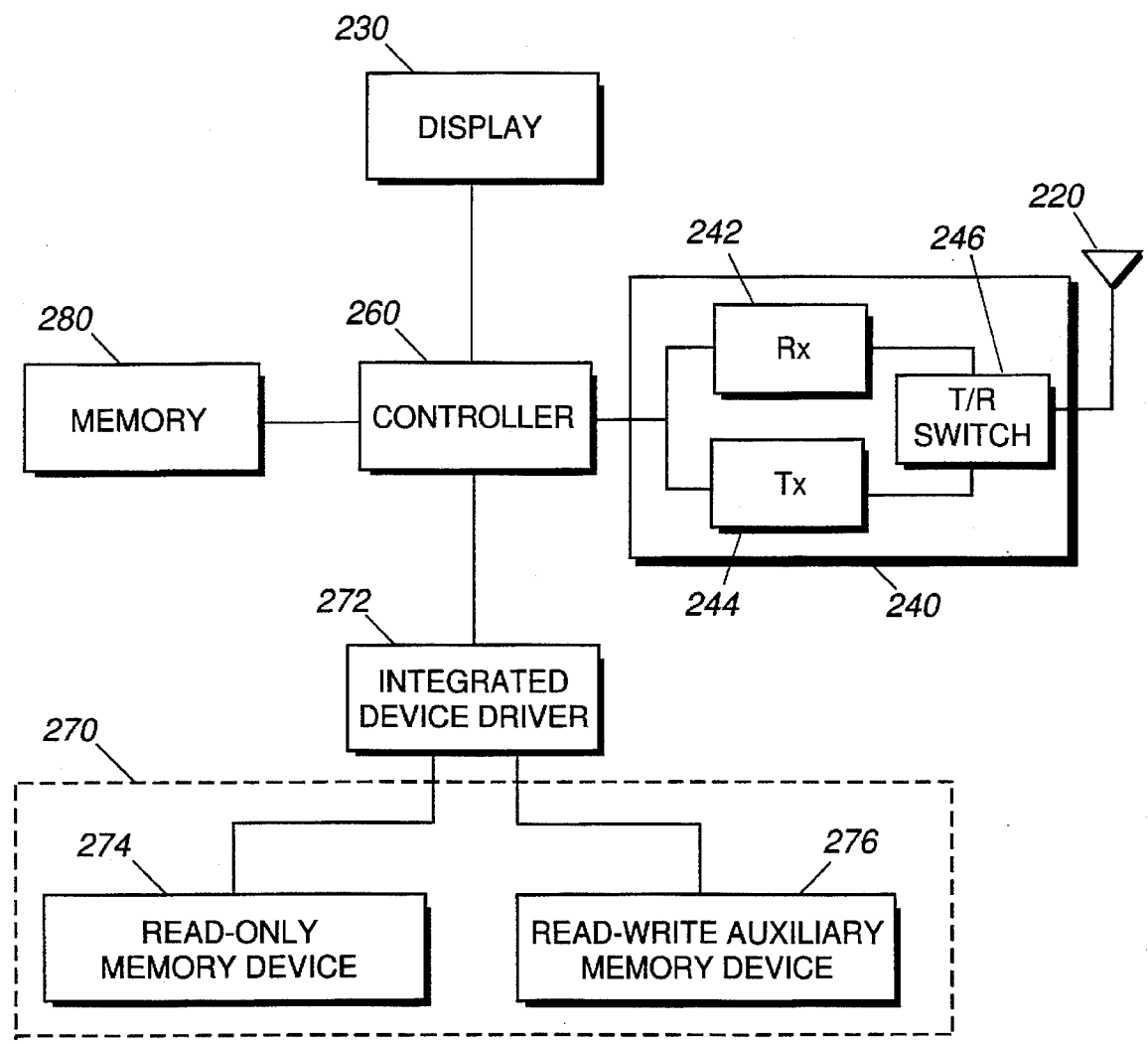
FIG. 2 is a block representation of a wireless computing device having a virtual update capable read-only memory data storage system, in accordance with the present invention.

FIG. 2 is a block representation of a typical data client 200, such as data client 110 of FIG. 1, in accordance with the present invention. The data client 200 is capable of operating over a wireless data network by executing receive and transmit operations, using well-known principles. A controller 260 uses logic and other information from an electrically coupled memory 280 to control the overall operation of the data client 200. The controller 260 is electrically coupled to a wireless network interface portion 240 which includes a receiver 242 and a transmitter 244. Both the receiver 242 and the transmitter 244 are coupled to a transmit/receive switch 246, which is coupled to an antenna 220. For receive operations, communication signals are received by the antenna 220 and are selectively processed by the receiver 242. Similarly, for transmit operations, communication signals are processed by the transmitter 244 and radiated through the antenna 220.

The controller interfaces with a data storage system 270 which includes a read only memory device 274 and a read-write auxiliary memory device 276. Interface to the data storage system 270 is provided by an integrated device driver 272 which presents the data storage system 270 as one logical device. The read-only memory device 274 is a write-protected media or section thereof, such as a CD-ROM disk or system, an electrically erasable programmable read-only memory (EEPROM), or the like. The read-only memory device 274 generally contains primary data, i.e., reference data which is not ordinarily modifiable. Depending on the application for which the data client is used, the primary data may include, for example, map-display data, engineering drawings, patents, an information database, a dictionary, and other similar relatively static-type information. The read-write memory device 276 is used to store supplementary data reflecting updates to the primary data. The device driver 272 interfaces to the data storage system by processing read and write requests to the data storage system, among other functions. Preferably, the transmitter 244 is used to request transmissions of changes data reflecting updates to the primary data of a particular read-only memory device. Alternatively, the data client 200 may be a receive-only device or may operate in receive-only mode, and may periodically receive unsolicited changes data. The receiver 242 is used to receive the changes data, and the device driver 272 is used to transform changes data into supplementary data. Optionally, the changes data may be in the proper format to be stored as supplementary data and thus would not need to undergo transformation to create the supplementary data.

Figure 3:
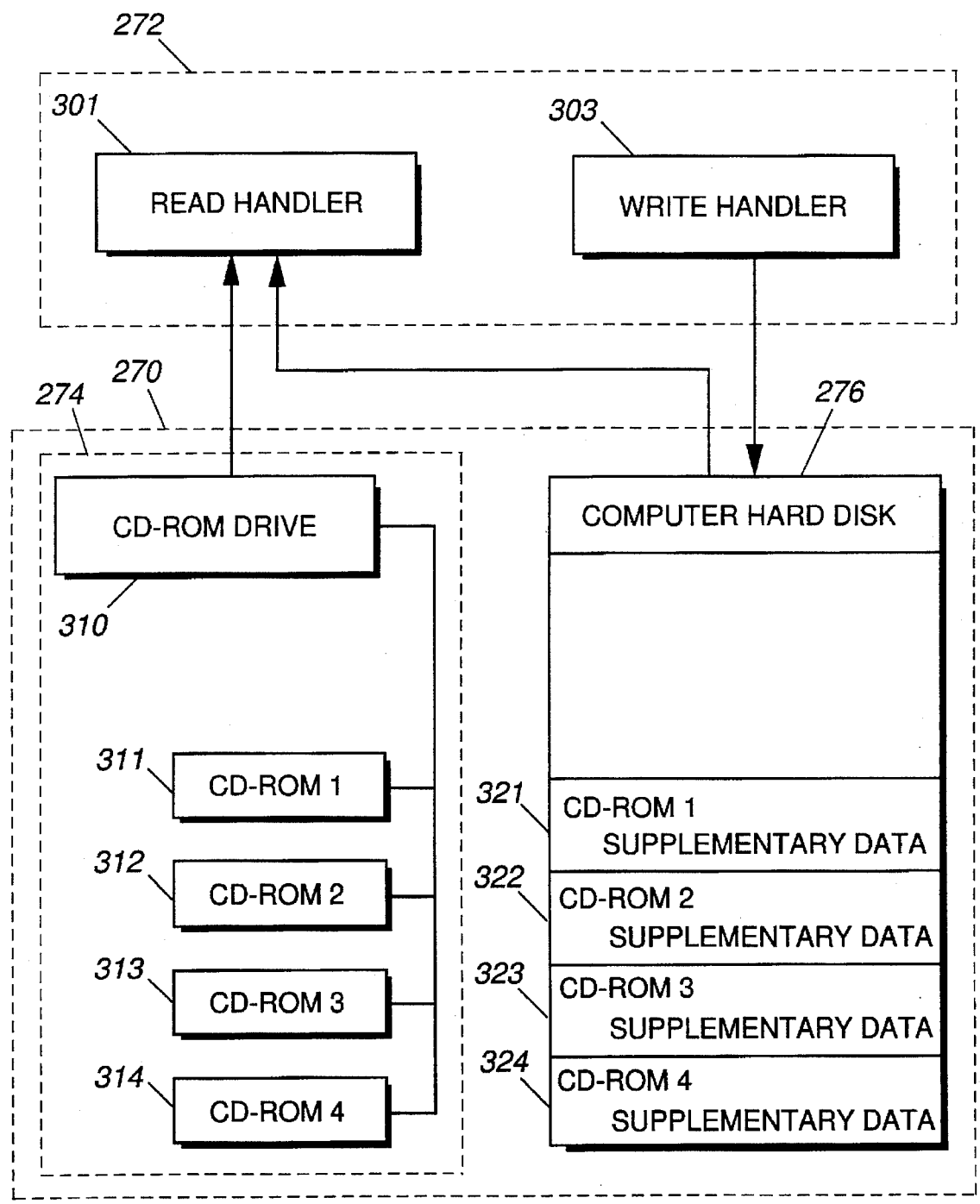
FIG. 3 is an embodiment of a device driver and data storage system, in accordance with the present invention.

FIG. 3 is a block representation of preferred embodiments of the integrated device driver 272 and data storage system 270 of FIG. 2, in which like reference numerals are carried forward for clarity. The read-only memory device 274 includes a CD-ROM drive 310, and multiple removable CD-ROM disks 311, 312, 313, 314. The CD-ROM drive 310 can handle multiple CD-ROM disks simultaneously. The auxiliary memory device 276 is a computer hard disk having a number of selectable storage areas 321, 322, 323, 324, each corresponding to a removable CD-ROM 311, 312, 313, 314 and containing supplementary data reflecting updates to the primary data on that CD-ROM. Each storage area 321, 322, 323, 324, has an identifier which uniquely identifies the removable CD-ROM such that the supplementary data can be readily associated with a particular CD-ROM, when that particular CD-ROM is loaded into the CD-ROM drive 310. The device driver 272 includes a read hander 301 and a write handler 303. The read handler is responsive to read requests received by the device driver 272. The read handler 301 provides a read response which contains a combination of the primary data stored on the read-only memory device, i.e., the CD-ROM, and supplementary data stored on the auxiliary memory device, i.e., the computer hard disk. The write handler 303 is responsive to write requests to store, on the auxiliary memory device 276, supplementary data reflecting updates to primary data on the read-only memory device 274.

Figure 4:
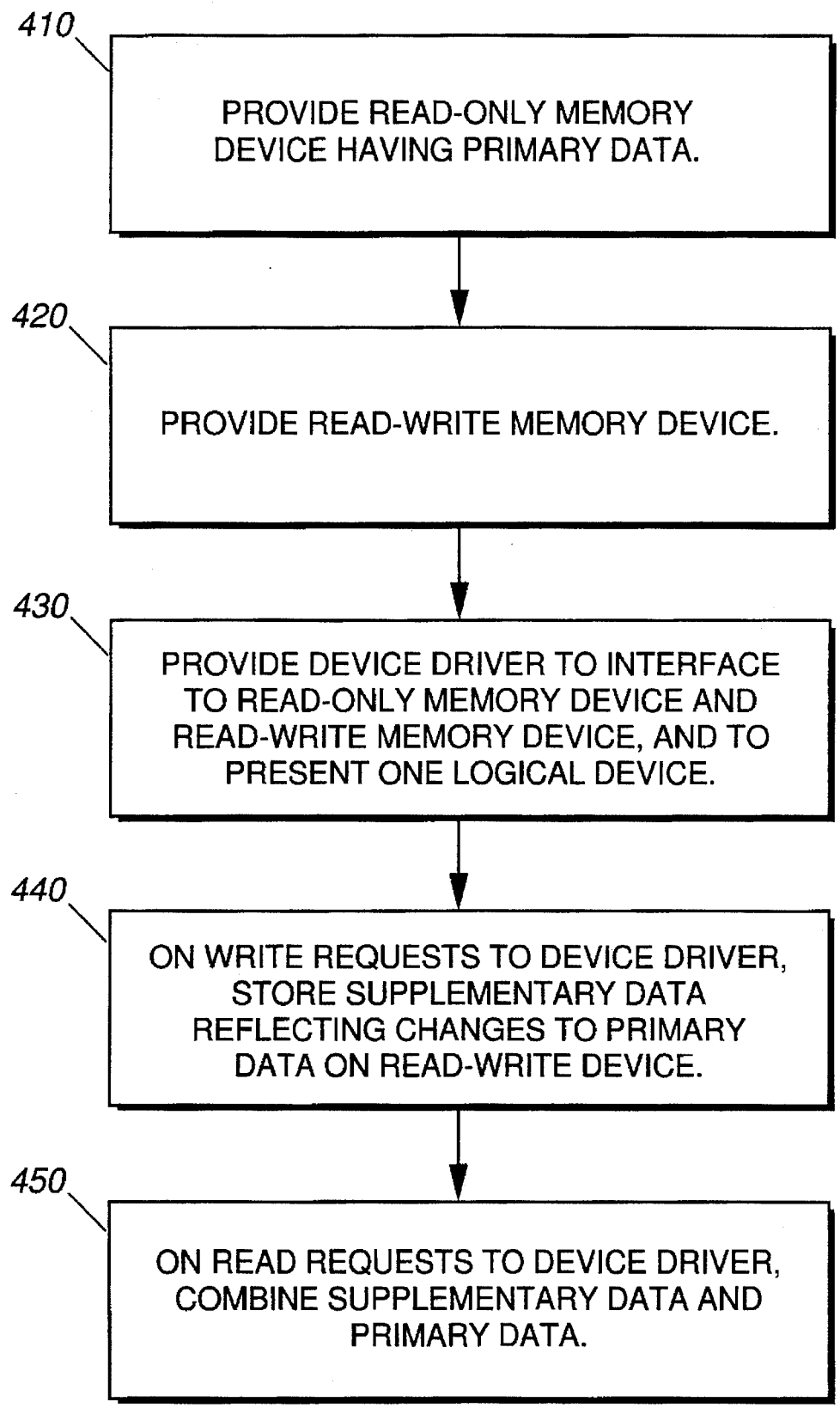
FIG. 4 is a summary of procedures for providing virtual update capabilities to a read-only memory device, in accordance with the present invention.

FIG. 4 summarizes the procedure for providing a system having a virtual update capable read-only memory in accordance with the present invention. A system has a data storage system including a read-only memory device with primary data stored thereon, step 410. The data storage system also includes an auxiliary memory device which operates in conjunction with the read-only memory device, step 420. The auxiliary memory device typically includes read-write memory to facilitate updates to the primary data on the read-only memory device. A device driver is provided as an interface with the data storage system, and integrates the read-only memory device and auxiliary memory device to present one logical device, step 430. The device driver supports write requests by storing on the auxiliary memory device, supplementary data reflecting updates to the primary data on the read-only memory device. The device driver also supports read requests by combining supplementary data from the auxiliary memory device with primary data from the read-only memory device to present a read response. The supplementary data stored on the auxiliary memory device may be received via a data network, such as by an over-the-air transmission. Alternatively, the supplementary data may be retrieved from a secondary medium, such as a floppy disk, hard drive or other medium. The read-only memory device is a CD-ROM, an integrated read-only memory circuit, or other write-protected media device. The read-write memory device is a EEPROM, hard disk, floppy disk or other similar media device.

The present invention provides significant benefits. Data which is infrequently modified can be published, or otherwise distributed, and used as primary data by an application. This primary data can be stored in a write-protected area, such as a read-only memory device, so that the primary data is available from the read-only device in its pristine form. An auxiliary memory device is provided which stores supplementary data reflecting updates to the primary data stored on the read-only memory device. This supplementary data, when combined with the primary data, presents information in an updated form to the respective applications. A device driver interfaces with the read only memory device and the auxiliary memory device to present one logical device to an application issuing a read-request or a write request with respect to the primary data. Thus, a data client or other computing device, interfaces with the hybrid data storage system as if only a single system was present. Consequently, an application need not be concerned with the details of data storage. Preferably, the device driver includes the necessary logic to combine primary and supplementary data to present a response to read-request, and to generate and store supplementary data with respect to updates to the primary data. Supplementary data can be sourced from secondary storage medium, data networks, or other similar sources. Distributed data, such as data available on CD-ROM, can be effectively updated without requiring a complete replacement of the distributed media. By incorporating the necessary logic in a device driver, updates to the primary data on the read-only memory device can be made transparent to the application which actually uses it.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A system having a virtual update capable read-only memory, comprising:
   a data storage system, including:
      a read-only memory device having primary data;
      an auxiliary memory device having supplementary data reflecting updates to the primary data; and
   a device driver interfacing with the data storage system, including a read handler, being responsive to a read request, to provide a read response comprising a combination of primary data from the read-only memory device and supplementary data from the auxiliary memory device;
   wherein:
      the read-only memory device comprises a removable write-protected media having an identifier; and
      the auxiliary memory device comprises a storage area selectable by identification corresponding to the identifier for the removable write-protected media.

2. The system of claim 1, wherein the device driver includes a write handler, being responsive to a write request, to generate supplementary data reflecting an update to the primary data, and to store the supplementary data on the auxiliary memory device.

3. The system of claim 1, wherein the read-only memory device comprises a CD-ROM.

4. The system of claim 1, wherein the auxiliary memory device comprises a computer hard disk.

5. A system having a virtual update capable read-only memory, comprising:
   a data storage system, including:

a read-only memory device having primary data;

an auxiliary memory device having supplementary data reflecting updates to the primary data; and a device driver interfacing with the data storage system, including a read handler, being responsive to a read request, to provide a read response comprising a combination of primary data from the read-only memory device and supplementary data from the auxiliary memory device;

wherein:

the read-only memory device comprises a plurality of write-protected media; and the auxiliary memory device comprises a plurality of storage areas each having supplementary data corresponding to one of the plurality of write-protected media.

6. A computing device having a data retrieval system, comprising:

a data storage system, including:

a plurality of removable read-only memory devices each having published data thereon;

a read-write memory device having a plurality of selectable storage areas, each storage area corresponding to one of said plurality of removable read-only memory devices, each storage area having supplementary data reflecting updates to the published data of a corresponding read-only memory device; and a device driver interfacing with the data storage system, including a read handler, being responsive to a read request, to provide a read response comprising a combination of supplementary data from a selectable storage area of the read-write memory device, and published data from a corresponding removable read-only memory device.

7. The computing device of claim 6, wherein the device driver further comprises a write handler, being responsive to a write request, to store supplementary data on a storage area of the read-write memory device.

8. The computing device of claim 7, further comprising:

means for requesting transmission of changes data reflecting updates to the published data of a particular read-only memory device; and means for receiving the changes data and for generating corresponding supplementary data.

9. A method of supporting virtual updates to read-only memory, comprising the steps of:

associating a particular identifier with a read-only memory device having primary data stored thereon;

selecting a storage area on a read-write memory device from among a plurality of storage areas corresponding to a plurality of read-only memory devices, using the particular identifier, which selected storage area stores supplementary data reflecting updates to the primary data on the read-only memory device; and processing read requests to the read-only memory device, by combining primary data from the read-only memory device and supplementary data from the selected storage area to form a read response.

10. The method of claim 9, wherein the supplementary data comprises data received from an over-the-air transmission.

11. The method of claim 9, wherein the read-only memory device comprises a CD-ROM.

* * * * *